United States Patent

[11] 3,580,101

| [72] | Inventors | Anker E. Jorgensen<br>Portland, Oreg.<br>Gerald K. Oxley, Lafayette, Ind. |
|---|---|---|
| [21] | Appl. No. | 774,911 |
| [22] | Filed | Nov. 12, 1968 |
| [45] | Patented | May 25, 1971 |
| [73] | Assignee | TRW Inc.<br>Cleveland, Ohio |

[54] TELESCOPING SECTION IN A STEERING COLUMN
1 Claim, 5 Drawing Figs.

[52] U.S. Cl. ................................................ 74/493, 180/78, 280/87
[51] Int. Cl. .............................................. B62d 1/18
[50] Field of Search ...................................... 74/493, 492; 180/78; 280/87.3; 287/58 (CT)

[56] References Cited
UNITED STATES PATENTS

| 2,865,222 | 12/1958 | Bachman ...................... | 74/493 |
| 2,895,345 | 7/1959 | McClure ....................... | 74/493 |
| 3,120,744 | 2/1964 | Dunn ............................ | 64/8 |
| 3,412,629 | 11/1968 | Hill ............................... | 74/493 |
| 3,430,456 | 3/1969 | Stricker ........................ | 287/58 |

Primary Examiner—Milton Kaufman
Attorney—Hill, Sherman, Meroni, Gross & Simpson

ABSTRACT: Telescoping section between a steering shaft and steering gear, comprising an elongated tube and an intermediate shaft sliding connected therewith for rotational driving. The intermediate shaft journaled in a bushing in the end of the elongated tube. An internal stop in the tube spaced from but near the bushing prevents buckling between the tube and the shaft. The steering shaft housing is adjustably mounted in the vehicle cab by means of adjustable brackets attached to the dashboard of the vehicle cab and the steering shaft housing.

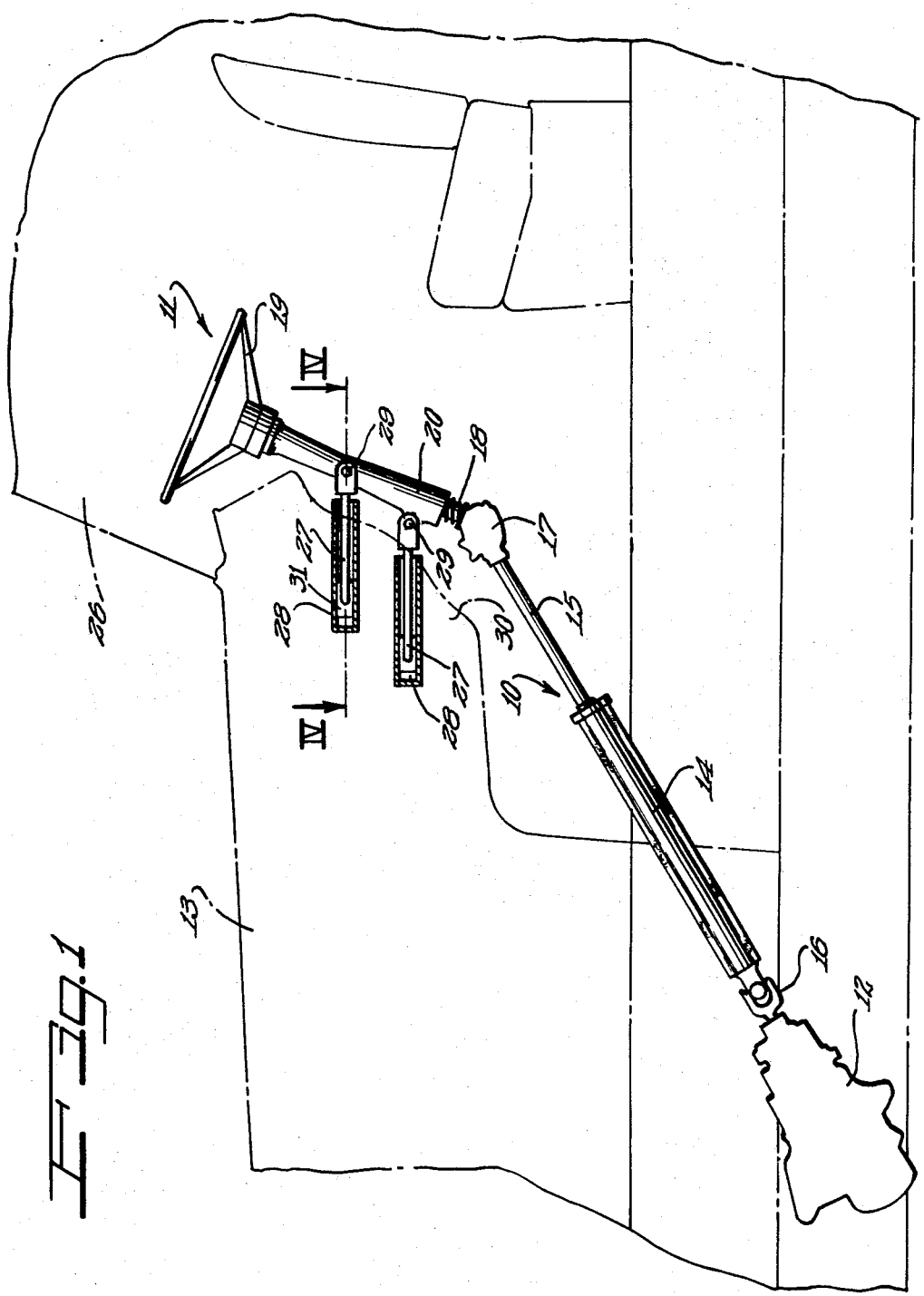

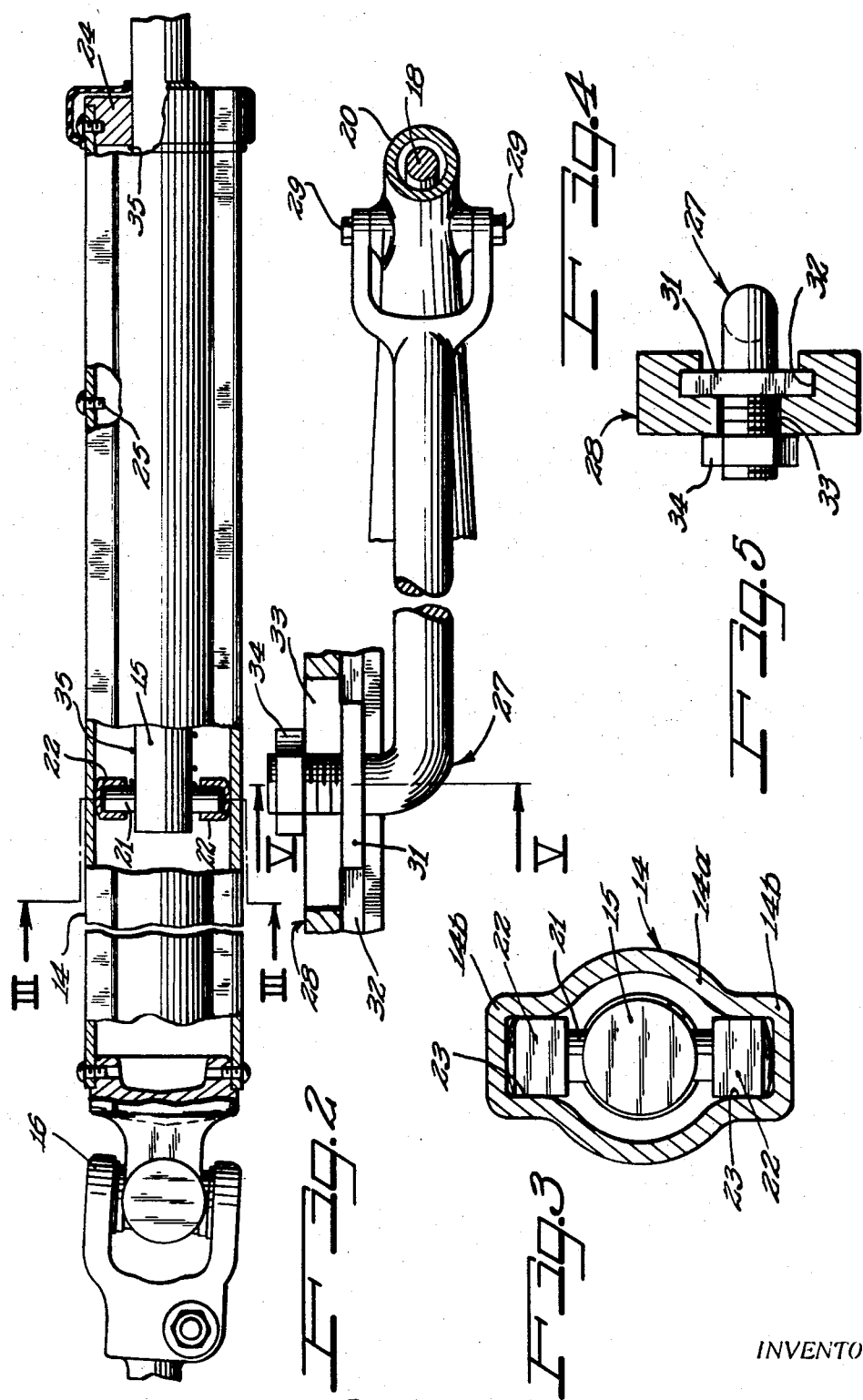

TELESCOPING SECTION IN A STEERING COLUMN

BACKGROUND OF THE INVENTION

This invention relates to a telescoping steering column for a vehicle. More specifically the invention relates to a telescoping tube-and-shaft connection between a steering shaft and steering gear on a vehicle.

It has been known for some time to provide very limited longitudinal adjustability in a steering column for a track to accommodate relative motion between the steering gear and the steering wheel due to such things as flexible mounting of the cab in which the steering wheel is attached, axial movement of the input shaft of the steering gear required by valve motion therein, and cumulative tolerances in the construction of trucks.

However, there exists a need for a collapsible steering column construction involving considerable longitudinal adjustability that will accommodate not only the aforementioned conditions, but also certain other things of paramount importance. For example, cab lengths may vary in a certain line of trucks, whereas many parts on these vehicles will be of the same size. Variation in cab length may dictate a variation in steering wheel position relative to the steering gear. Another desired variable is the position of a steering wheel with respect to the cab in which it is located in order to accommodate drivers of different sizes. Furthermore, if a truck has a collapsible steering column, a severe front end collision can occur without pushing the steering wheel back into the operator.

An object of the present invention is to provide an adjustable steering column that will accommodate to the various conditions mentioned above. Adjustability is provided in a section of the column connected at one end to the steering shaft and at the other end to the steering gear and in the mounting of the steering shaft in the vehicle cab.

A further object of this invention is to provide a collapsible steering column for trucks which has a wide range of length and angle adjustment to accommodate many variables in truck constructions.

Other and further important objects of this invention will become apparent from the attached drawings and the detailed description following the brief description of the drawings.

SUMMARY OF THE INVENTION

The present adjustable steering column includes an elongated tube and an intermediate shaft slidingly connected with one another for rotational driving between steering shaft and steering gear, a bushing in the end of the tube mounting the shaft, and an internal stop in the tube spaced from but near the bushing for preventing buckling between the elongated tube and intermediate shaft. The steering shaft housing is adjustably mounted in the vehicle cab through adjustable brackets attached to the dashboard of the vehicle cab and the steering shaft housing.

BRIEF DESCRIPTION OF THE DRAWINGS

FIG. 1 is an elevational view, with parts broken away and in phantom outline showing the mounting of the adjustable steering column of the present invention in a vehicle;

FIG. 2 is a fragmentary elevational view, with parts broken away and in section, of the steering column;

FIG. 3 is a sectional view taken on the line III-III of FIG. 2 showing how shoes on a shaft engage channels in the tube;

FIG. 4 is a sectional view taken on the line IV-IV of FIG. 1, showing the manner in which a housing for a steering shaft is adjustably supported in a vehicle;

FIG. 5 is a sectional view taken on the line V-V of FIG. 4.

DESCRIPTION OF THE PREFERRED EMBODIMENT

As shown in FIG. 1, an adjustable unit 10 of the present invention is connected between a steering unit 11 and steering gear 12, all mounted in a vehicle 13. The unit 10 comprises a tube 14 and a shaft 15 having telescoping engagement therewith. The tube 14 has one end connected through a universal joint or flexible coupling 16 with steering gear 12. The shaft 15 has one end located in the tube 14 and the other end connected through a universal joint or flexible coupling 17 with one end of a steering shaft 18 forming part of the steering unit 11. The steering unit 11 also includes a steering wheel 19 connected to the other end of the steering shaft 18 and a housing 20 for the steering shaft.

As shown in FIGS. 2 and 3, the end of the shaft 15 located in the tube 14 carries a pin 21 extending transversely through the shaft and shoes 22 carried on the ends of the pin 21 in diametrically opposed relation to one another. The shoes 22 ride in internal longitudinal diametrically opposed channels or grooves 23 formed in the tube 14. Thus as shown in FIG. 3, the tube 14 has a cross-sectional contour with a cylindrically formed central portion 14a and diametrically opposed channel subportions 14b with flat sidewalls and flat tops. The shaft 15 is slidably mounted in a bushing 24 secured within the end of the tube 14 remote from the universal joint 16. An internal stop 25 in the form of a screw extending through the wall of the tube 14 at the base of one channel 23 is spaced from the bushing 24, but is closer to it than to the end of the tube away from the bushing. The internal stop 25 lies in the path of one shoe 22 so as to limit rightward movement of the shaft 15 as viewed in FIG. 2.

As shown in FIG. 1, the steering unit 11 is located in a cab 26 of the vehicle 13. The steering unit 11 is adjustably supported in the vehicle cab 26 by two spaced pairs of brackets 27 and 28. The brackets 27 are connected at one end to spaced regions of the housing 20 for the steering shaft 18 as indicated at 29. The other ends of the brackets 27 are adjustably mounted in the brackets 28 which are secured in spaced relation to one another to a dashboard 30 located in the vehicle cab 26. As shown in FIGS. 1, 4 and 5, each bracket 27 has a rectangular shoe 31 slidably fitting a channel 32 formed in the associated bracket 28. The end of each bracket 27 adjacent the shoe 31 is threaded and extends through an elongated slot 33 formed in the associated bracket 28. A nut 34 is threaded on the threaded end of the bracket 27 and bottoms against the bracket 28. The steering unit 11 is adjustable in the cab 26 to provide different positions of the steering wheel 19 for drivers of various sizes by adjustment of the brackets 27 within the brackets 28, the shoes 31 of the brackets 27 sliding along the channels 32 of the brackets 28 after loosening of the nuts 34. When the desired position of the steering wheel 19 is reached, the nuts 34 are tightened to maintain the steering wheel in desired position, by fixing the brackets 27 to the brackets 28. As shown in FIG. 2, a load-equalizing spring 35, which surrounds the shaft 15 and engages the bushing 24 at one end and the pin 21 at the other end, urges the shaft 15 into the tube 14 and thus tends to shorten unit 10.

In operation of the vehicle 13, turning of the steering wheel 19 is transmitted through the steering shaft 18, universal joint 17, the shaft 15, the tube 14, the universal join 16, and the steering gear 12 to the vehicle wheels (not shown), which are connected in a manner not shown to the steering gear 12. Rotation of the shaft 15 is transmitted to the tube 14 through the pin 21 and thimblelike shoes 22 on the end of the shaft and the grooves 23 in the tube 14 engaged by the shoes 22. The shaft 15 may move lengthwise with respect to the tube 14, because the shoes 22 on the shaft are slidable along the grooves 23 in the tube and the tube 15 itself is slidably mounted in the bushing 24 in the tube 14.

Since the shaft 15 may move longitudinally with respect to the tube 14 without interference with the rotational driving engagement of the shaft with the tube, it is possible for the steering unit 11 to be adjusted toward and away from the steering gear 12. Thus by adjustment of the brackets 27 with respect to the bracket 28, the steering wheel 19 may be adjusted to a variety of positions in the cab 26 to suit drivers of various sizes. If one vehicle cab 26 is longer than another, the seat therein may be farther from the vehicle dash 30. In this event the steering unit 11 will have to be farther from the vehicle dash 30 and presumably farther from the steering gear 12 to accommodate a given size of driver. The longitudinally adjustable driving connection between the shaft 15 and the tube 14 automatically accommodates wide variations in spacing between the steering column or housing 20 and the gear 12. If the vehicle 13 has a front end collision the steering gear 12 may be moved backwards toward the steering unit 11. The shaft 15 and the tube 14 will accommodate such a shift.

The shoes 22 can move to the right as viewed in FIG. 2 only as far as the stop 25 in the tube 14. Thus the shoes 22 are spaced from the bushing 24 by an amount at least as great as the spacing between the stop 25 and the bushing 24. Since engagement between the tube 14 and the shaft 15 occurs at the bushing 24 and at the shoes 22, and the internal stop 25 of the tube 14 keeps the shoes 22 spaced from the bushing 24, these two regions of engagement between the tube 14 and shaft 15 are well spaced from one another. This spacing of the connecting support areas between the tube 14 and shaft 15 maintains the tube and shaft in axial columnar alignment and resists angular deflection such as might occur if the inner end of the shaft 15 were allowed to move into juxtaposition with the end of the tube just inwardly from the bushing 24. Thus adequate column buckling strength is insured for example to resist road shocks and other forces resulting from normal heavy duty vehicle usage.

It will be understood that the illustrated embodiment of the invention has been used for illustrative purposes only and that various modifications and variations of the present invention may be effected without a departure from the spirit and scope of the novel concepts thereof.

We claim:
1. In a steering column for a vehicle comprising:
steering gear having a universal joint at one end, a steering shaft having a universal joint at one end, and a steering wheel connected to the other end of the steering shaft; the combination with the steering shaft and steering gear, of
  a. an elongated tube having two opposed internal longitudinal channels and being connected at one end to the universal joint of the steering gear,
  b. a bushing attached inside the other end of the tube,
  c. an intermediate shaft slidably engaging the bushing, connected at one end to the universal joint of the steering shaft, and carrying a pin extending transversely through the said other end of the shaft and a pair of shoes mounted on the ends of the pin and slidably engaging the opposed channels in the tube,
  d. a load-equalizing spring surrounding the intermediate shaft and acting at one end against the bushing and at the other end against the pin, and
  e. a stop member attached to the tube in spaced relation to the bushing but being closer to the bushing than to the said one end of the tube, the stop member projecting into one channel of the tube into the path of one of the shoes along said one channel, for preventing buckling between the tube and intermediate shaft by preventing the spacing between regions of engagement between said intermediate shaft and the bushing in the tube and between the tube and the shoes on the intermediate shaft from becoming less than the spacing between the stop member and the bushing.